United States Patent [19]

Cole, Jr. et al.

[11] 4,313,730
[45] Feb. 2, 1982

[54] METAL CHAIN BELT

[75] Inventors: Edward H. Cole, Jr., Ithaca; John M. Kern, Moravia; James A. Wyckoff, Interlaken, all of N.Y.

[73] Assignee: Borg-Warner Corporation, Chicago, Ill.

[21] Appl. No.: 130,772

[22] Filed: Mar. 17, 1980

[51] Int. Cl.³ .............................................. F16G 13/08
[52] U.S. Cl. ..................................... 474/201; 474/245
[58] Field of Search ............... 474/272, 242, 244, 245, 474/201

[56] References Cited

U.S. PATENT DOCUMENTS

| | | | |
|---|---|---|---|
| 801,451 | 10/1905 | Fouillaron . | |
| 962,563 | 6/1910 | Foster et al. | 474/201 |
| 2,038,583 | 4/1936 | Maurer | 74/236 |
| 2,475,264 | 7/1949 | Sutton | 74/236 |
| 3,720,113 | 3/1973 | Van Doorne et al. | 74/236 |
| 3,949,621 | 4/1976 | Beusink et al. | 74/231 M |
| 4,080,841 | 3/1978 | Vollers | 474/272 |
| 4,177,687 | 12/1979 | Russ | 474/242 |
| 4,193,312 | 3/1980 | Cicognani | 474/242 |

FOREIGN PATENT DOCUMENTS 2414989 10/1975 Fed. Rep. of Germany ...... 474/201
1066329 6/1954 France ................................ 474/201

Primary Examiner—C. J. Husar
Assistant Examiner—Conrad Berman
Attorney, Agent, or Firm—Aubrey L. Burgess

[57] ABSTRACT

A flexible power transmission means comprising an assembly of a chain constructed of a plurality of sets of interleaved links joined to its next adjacent set by a pin, and load blocks surrounding the chain and located between the next adjacent pins. Additional load blocks may be located over the pins. The load blocks are generally contoured at their edges to fit into the V of a pulley. When the load blocks are close together, the front and rear surface of at least some of the load blocks are tapered to permit articulation of the assembly. The load is carried by the chain's pins; the blocks are located longitudinally by the pins.

6 Claims, 19 Drawing Figures

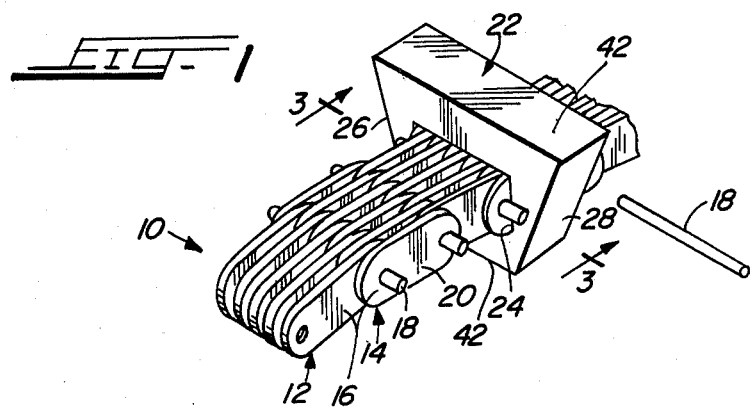
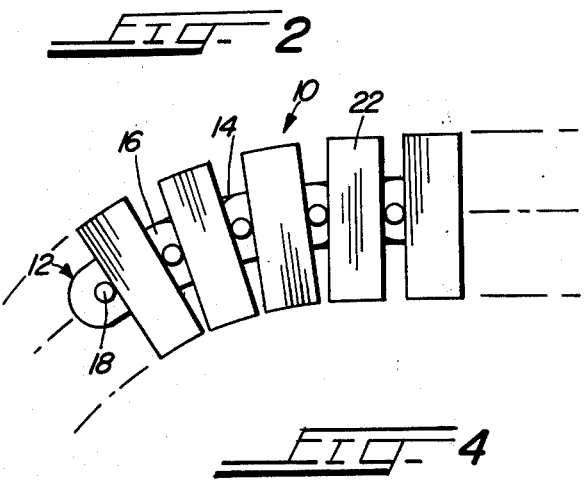
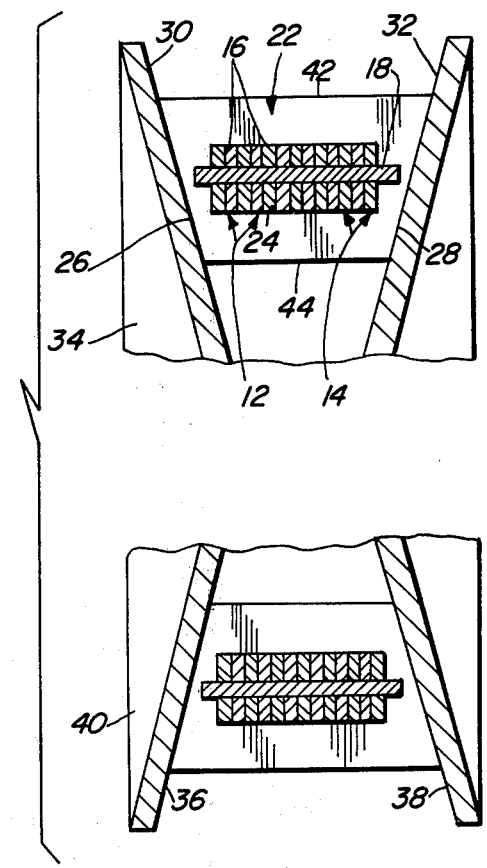
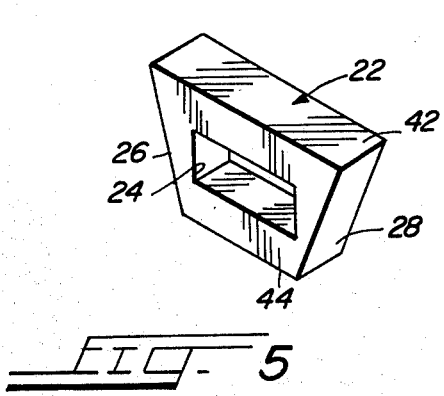
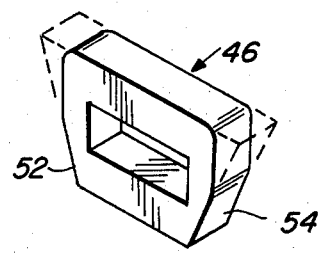

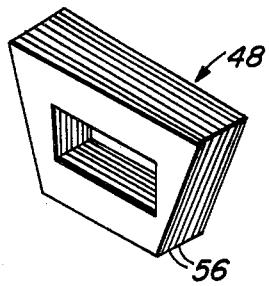
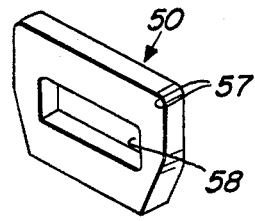
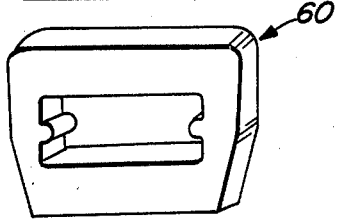
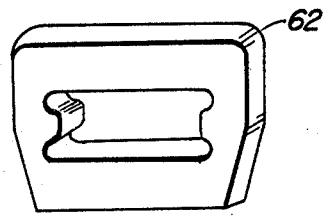
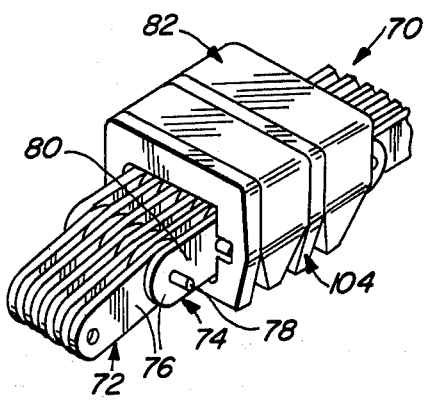
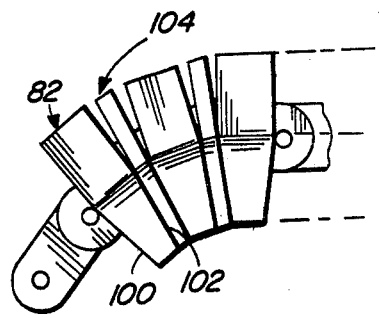
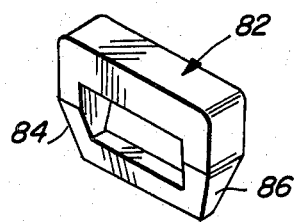
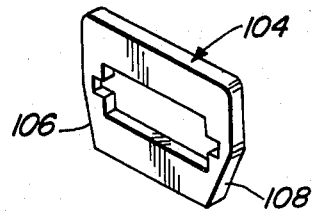

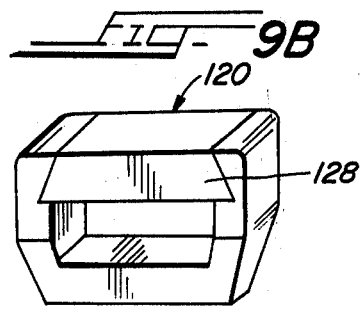
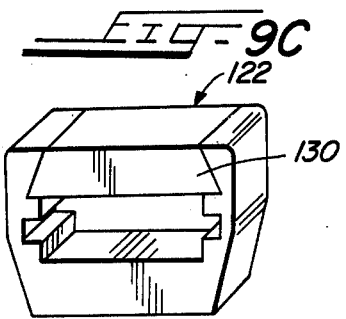
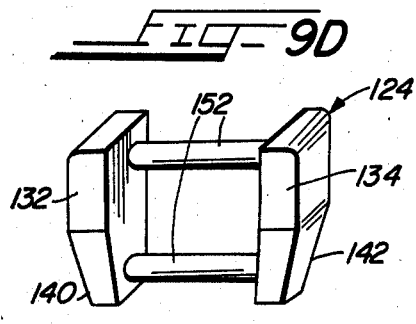
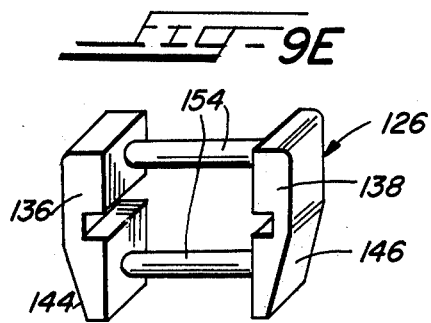
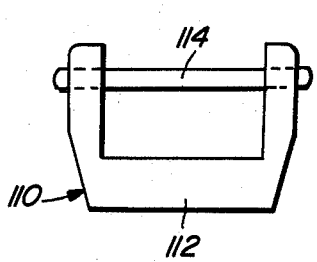
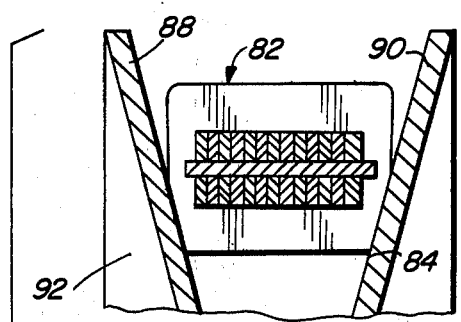
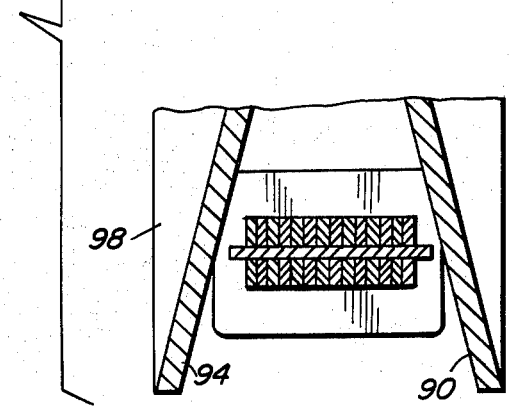

METAL CHAIN BELT

BACKGROUND OF THE INVENTION

Flexible power transmission means comprising an assembly of a plurality of superimposed steel strips and a plurality of V-shaped blocks of metal are known in the art. An example of such construction is disclosed in U.S. Pat. No. 3,720,113 granted Mar. 13, 1973 to H. J. Van Doorne et al. In the patented structure, the blocks are provided with lateral guides having top edges which overlie the steel strips to maintain the parts in assembled relationship. The blocks can slide longitudinally on the steel strips and the load in this type of belt is carried by the blocks.

Another example of a flexible power transmission means is described in U.S. Pat. No. 3,949,621 granted Apr. 13, 1976 to Beusink, deceased, et al. in which metal plates are mounted on metal strips, the strips being received in slots in the lateral edges of the plates.

Other flexible power transmission means comprising an assembly of links, pins and pulley contact members are described in U.S. Pat. Nos. 2,038,583, granted Apr. 28, 1936 to Maurer and 2,475,264, granted July 5, 1949 to Sutton.

THE INVENTION

According to the invention to be described herein, a flexible power transmission means comprising an assembly of a plurality of interleaved sets of links, each set being joined to its next adjacent set by a pin to permit articulation of the sets of links and load blocks surrounding the links positioned at certain locations with respect to the sets of links.

In one form of the invention, each pin extends beyond the lateral sides of the links and the load blocks are positioned between some or all of the spaces between adjacent pins.

In another form of the invention, the sets of links are joined by pins and load blocks are positioned between each of the next adjacent pins and additional load blocks are positioned between the adjacent first-named load blocks and over the pins.

In either embodiment, the load is carried by the chain's pins and the blocks are located longitudinally by the pin.

THE DRAWINGS

FIG. 1 is a perspective view of a portion of one embodiment of a flexible power transmission means according to this invention;

FIG. 2 is a side view of the means of FIG. 1;

FIG. 3 is a partial sectional view of the means of FIG. 1 showing a pulley with which the means is used;

FIG. 4 is a perspective of a load block used in the FIG. 1 structure;

FIG. 5 is a perspective of an alternative load block;

FIGS. 5A, 5B, 5C and 5D are perspectives of other alternative load blocks;

FIG. 6 is a perspective view of a portion of a second embodiment of a power transmission means according to this invention;

FIG. 7 is a side view of the means of FIG. 6;

FIG. 8 is a partial sectional view of the means of FIG. 6 showing a pulley with which the means may be used;

FIGS. 9 and 9A are perspectives of one type of load blocks used in the FIG. 6 embodiment;

FIGS. 9B, 9C, 9D and 9E are additional forms of load blocks usable in the FIG. 6 embodiment of the invention.

FIG. 9F is an illustration of the last assembled load block for the FIG. 6 embodiment.

DETAILED DESCRIPTION

Attention is invited to FIGS. 1 to 4 of the drawings which illustrate one embodiment of the invention. The flexible power transmission means comprises an assembly, generally identified as 10, of a plurality of sets 12 and 14 of interleaved links 16, the adjacent sets being connected by pins 18 which extend beyond the sides 20 of the sets 14 of links 16. The links are illustrated as being of a shape similar to British Standard roller chain; other shapes may be used without departing from the spirit of the invention. Between the adjacent pins 18 are load blocks 22, each load block having a central opening 24, so as to fit over the set of links. The load blocks 22 each have opposite tapered sides or friction surfaces 26, 28, adapted to contact pulley flanges 30 and 32 of pulley 34 and 36 and 38 of pulley 40. The surfaces 26, 28 may be roughened to enhance the contact with the flanges if desired. The top 42 and bottom 44 of each block are generally plane and parallel to one another. The thickness of each block is chosen to be the distance between the adjacent pins and the pins transmit force to the load blocks and vice versa. The need to constrain the chain links laterally by pin riveting is eliminated, since the load blocks perform this function; however, in order to maintain the pins in their position, the external links may be constructed with one opening providing a slip fit for a pin and one opening providing for a press fit with a pin. The structure is assembled by alternatively assembling blocks and sets of links and pins, as will be understood.

Alternative load blocks 46, 48 and 50 are illustrated in FIGS. 5, 5A and 5B. The load block 46 has friction surfaces 52 and 54 which are shorter in length than the surfaces 26, 28 of the FIG. 1 embodiment. The corners of the load blocks 46 are rounded to make the assembly safer to handle. The weight of the assembled structure is also reduced by the modifications in load blocks.

The load block 48 illustrated in FIG. 5A is comprised of a plurality of thin metal sections or laminations 56 stacked together; the exterior configuration can be as in the FIG. 1 and FIG. 5 embodiment. Load blocks 48 are easy to manufacture because the sections are stamped from sheet metal while others are machined, cast or manufactured by powder metallurgy methods.

FIG. 5B illustrates load block 50 which has a radius relief 57 at the corners of the internal opening 58 functioning to decrease stress concentration at the inside corners.

FIGS. 5C and 5D illustrate load blocks 60 and 62, respectively, which are provided with a radius relief of sharp internal corners to enhance stampability and decrease stress concentrations at those inside corners.

FIGS. 6, 7, 8, 9, 9A and 9B illustrate a second embodiment of this invention which comprises a flexible power transmission means assembly, generally identified as 70. The assembly 70 comprises a plurality of sets 72 and 74 of interleaved links 76, the adjacent sets being connected by pins 78 which extend beyond the sides 80 of the sets 74 of links 76. Between adjacent pins 78 are load blocks 82 having tapered side friction surfaces 84, 86 to engage the flanges 88 and 90 of pulley 92 and flanges 94 and 96 of pulley 98. The blocks 82 are also tapered at 100 and 102. As before the friction surfaces 84, 86 may be roughened to enhance the frictional contact with the pulley flanges. Alternative load blocks 104 are located between the load block 82 and over the pins. The load blocks 104 have tapered side friction surfaces 106 and 108 to engage the pulley flanges 88, 90 and 94, 96, respectively. A special load block 110 is required for the last to be assembled part, i.e., one having a generally C-shaped body 112 and a pin 114, see FIG. 9F. The tapered front and back surfaces 100 and 102, of the load blocks 82 permit articulation of the assembly. The load blocks 104 need not be tapered. In that the alternative blocks 82 and 104 abut one another at least on parts of their front and back surfaces, backbend of the assembly is impossible. Thus, any tendency for snaking is eliminated. As will be readily understood, the blocks 82 and 104 are positioned during pinning of the sets of links.

Attention is now invited to FIGS. 9B, 9C, 9D and 9E illustrating load blocks 120, 122 and 124, 126 constructed to be positioned after the links have been pinned. The blocks 120 and 122 correspond to the blocks 82 and 104, respectively, except that they have dovetail portions 128 and 130 which permit positioning or removal for repair or replacement after the links have been pinned.

The blocks 124 and 126 correspond to the blocks 82 and 104, respectively and have separate end members 132, 134 and 136, 138, respectively, each end member having a tapered friction surface, 140, 142, 144 or 146 for engaging the respective pulley flanges. The end members 132 and 134 are joined by rods 152, 154. The construction of the blocks 124 and 126 also permit positioning of the blocks or removal for replacement and/or repair after the links have been pinned.

It should be understood that the alternative load block constructions of FIGS. 5A, 5B, 5C and 5D can be adapted and used for the load blocks of the FIG. 6 embodiment, and that the load block constructions of FIGS. 9B, 9C, 9D and 9E can be adapted and used for the load blocks of the FIG. 1 embodiment.

We claim:

1. A flexible power transmission belt assembly especially adaptable for use in a pulley transmission comprising:
   a plurality of interleaved sets of links;
   means joining each set of links to its next adjacent set of links to permit articulation of said assembly;
   each joining means extending laterally beyond the side edges of the links; and
   a plurality of metal load blocks surrounding said links, each of said load blocks being positioned between adjacent joining means in substantial contact therewith to transmit load to said joining means and thus to said links, each load block having side edges contoured to contact the pulleys of a transmission.

2. A flexible power transmission means as recited in claim 1 in which said side edges of said load blocks are roughened to enhance the contacts with a pulley of said transmission.

3. A flexible power transmission belt assembly especially adaptable for use in a pulley transmission comprising:
   a plurality of interleaved sets of links;
   means joining each set of links to its next adjacent set of links to permit articulation of said assembly;
   each joining means extending laterally beyond the side edges of the links;
   a plurality of first metal load blocks surrounding said links and extending from said links, each load block being positioned between adjacent joining means in substantial contact therewith to transmit load to said joining means and thus to said links, each load block having side edges contoured to contact the pulleys of a transmission;
   a plurality of second metal load blocks surrounding said assembly and between adjacent first load blocks, said second load blocks being positioned over a joining means with side edges contained to contact the pulleys of a transmission, and
   converging front and rear surfaces on said first load blocks permitting articulation of said assembly.

4. A flexible power transmission means as recited in claims 1 or 3 further comprising load blocks constructed of a plurality of laminated members.

5. A flexible power transmission means as recited in claims 1 or 3 further comprising load blocks constructed of side members joined by top and bottom members.

6. A flexible power transmission means as recited in claims 1 or 3 further comprising load blocks having a generally C-shaped part of a bottom and sides and a dovetail member joining the sides.

* * * * *